United States Patent
Zhuo et al.

(10) Patent No.: US 10,761,948 B1
(45) Date of Patent: Sep. 1, 2020

(54) METHOD, APPARATUS, AND ELECTRONIC DEVICE FOR RESTORING STATE DATA OF BLOCKCHAIN

(71) Applicant: Alibaba Group Holding Limited, George Town (KY)

(72) Inventors: Haizhen Zhuo, Hangzhou (CN); Benquan Yu, Hangzhou (CN); Zhonghao Lu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/776,301

(22) Filed: Jan. 29, 2020

Related U.S. Application Data

(63) Continuation of application No. PCT/CN2020/071357, filed on Jan. 10, 2020.

(30) Foreign Application Priority Data

Jul. 13, 2019 (CN) .......................... 2019 1 0703814

(51) Int. Cl.
*G06F 11/14* (2006.01)
*H04L 9/08* (2006.01)

(52) U.S. Cl.
CPC ........ *G06F 11/1469* (2013.01); *H04L 9/0816* (2013.01)

(58) Field of Classification Search
CPC ........................... G06F 11/1469; H04L 9/0816
(Continued)

(56) References Cited

U.S. PATENT DOCUMENTS 10,091,228 B2 10/2018 Li et al.
10,261,711 B1 * 4/2019 Pasirstein ............... G06F 21/64
(Continued)

FOREIGN PATENT DOCUMENTS

CN 106383754 2/2017
CN 106815530 6/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Michael Pham
(74) *Attorney, Agent, or Firm* — Fish & Richardson P.C.

(57) ABSTRACT

A computer-implemented method, computer-implemented apparatus, and non-transitory, computer-readable medium for restoring state data of a blockchain. Account state data in the blockchain is organized into a Merkle state tree and stored in a database. The Merkle state tree includes a current Merkle state tree obtained by organizing a latest account state of each blockchain account and a historical Merkle state tree obtained by organizing a historical account state of each blockchain account. A target block to be restored is determined, where the target block is any historical block preceding a latest block of the blockchain. State restoration logic is iteratively performed until a latest account state corresponding to each blockchain account on a current Merkle state tree of the latest block is restored to a historical account state corresponding to each blockchain account on a historical Merkle state tree of the target block.

30 Claims, 6 Drawing Sheets

Determine a target block to be restored, where the target block is any historical block preceding a latest block of the blockchain ⸺ 302

Iteratively execute state restoration logic until a latest account state corresponding to each blockchain account on a current Merkle state tree of the latest block is restored to a historical account state corresponding to each blockchain account on a historical Merkle state tree of the target block ⸺ 304

(58) Field of Classification Search
USPC .......................................................... 707/674
See application file for complete search history.

(56) References Cited

U.S. PATENT DOCUMENTS

| | | | |
|---|---|---|---|
| 2019/0103973 A1 | 4/2019 | Chalkias et al. | |
| 2019/0228386 A1 | 7/2019 | Onnainty | |
| 2020/0073962 A1* | 3/2020 | Natarajan | ................ G06F 16/27 |
| 2020/0076571 A1* | 3/2020 | Natarajan | ........... G06F 16/2246 |

FOREIGN PATENT DOCUMENTS

| | | |
|---|---|---|
| CN | 108197226 | 6/2018 |
| CN | 108282474 | 7/2018 |
| CN | 108923932 | 11/2018 |
| CN | 110471795 | 11/2018 |
| CN | 109710620 | 5/2019 |
| CN | 109919756 | 6/2019 |

OTHER PUBLICATIONS

Nakamoto "Bitcoin: A Peer-to-Peer Electronic Cash System," www.bitcoin.org, 2005, 9 pages.

Tan et al, "Research and Implementation of Network Log Management and Analysis Technology," Beijing University, Jun. 2015, 66 pages (with English abstract).

* cited by examiner

METHOD, APPARATUS, AND ELECTRONIC DEVICE FOR RESTORING STATE DATA OF BLOCKCHAIN

CROSS-REFERENCE TO RELATED APPLICATIONS

This application is a continuation of PCT Application No. PCT/CN2020/071357, filed on Jan. 10, 2020, which claims priority to Chinese Patent Application No. 201910703814.4, filed on Jul. 31, 2019, and each application is hereby incorporated by reference in its entirety.

TECHNICAL FIELD

One or more implementations of the present specification relate to the field of blockchain technologies, and in particular, to a method, an apparatus, and an electronic device for restoring state data of a blockchain.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recording by each computing device, and fast data synchronization between computing devices, the blockchain technology has been widely used in many fields.

SUMMARY

The present specification provides a method for restoring state data of a blockchain, where account state data in the blockchain is organized into a Merkle state tree and stored in a database; the Merkle state tree includes a current Merkle state tree obtained by organizing a latest account state of each blockchain account, and a historical Merkle state tree obtained by organizing a historical account state of each blockchain account; and the method includes the following: determining a target block to be restored, where the target block is any historical block preceding a latest block of the blockchain; and iteratively executing state restoration logic until a latest account state corresponding to each blockchain account on a current Merkle state tree of the latest block is restored to a historical account state corresponding to each blockchain account on a historical Merkle state tree of the target block, where the state restoration logic includes the following: determining a target account associated with a transaction in the latest block and querying a historical account state corresponding to the target account on a historical Merkle state tree of a previous block of the latest block; and modifying a latest account state corresponding to the target account on the current Merkle state tree of the latest block as the historical account state corresponding to the target account on the historical Merkle state tree of the previous block, and redetermining the previous block as the latest block after completion of the modification.

Optionally, the determining a target account associated with a transaction in the latest block includes the following: re-executing the transaction in the latest block to determine the target account associated with the transaction in the latest block; or querying a read-write set corresponding to the latest block to determine the target account associated with the transaction in the latest block; and the querying a historical account state corresponding to the target account on a historical Merkle state tree of a previous block of the latest block includes the following: querying the historical account state corresponding to the target account on the historical Merkle state tree of the previous block of the latest block; or querying, in a read-write set corresponding to the previous block of the latest block, the historical account state corresponding to the target account on the historical Merkle state tree of the previous block of the latest block.

Optionally, before the iteratively executing state restoration logic, the method further includes the following: determining whether the total number of transactions included from a genesis block of the blockchain to the target block is greater than the total number of transactions included from the target block to the latest block; and if yes, further iteratively executing the state restoration logic.

Optionally, the method further includes the following: after a transaction in any block in the blockchain is executed, generating an updated data node corresponding to a current Merkle state tree of the block and a historical data node corresponding to a historical Merkle state tree of the block based on a latest account state of a target account associated with the transaction in the block; modifying and updating a data node corresponding to the target account on a current Merkle state tree of a previous block of the block based on the generated updated data node, to obtain the current Merkle state tree of the block; and creating a historical Merkle state tree for the block based on the generated historical data node and a data node other than the multiplexed data node corresponding to the target account on a historical Merkle state tree of the previous block of the block.

Optionally, the data node on the current Merkle state tree is organized into a B+ tree data structure and stored in the database; and the data node on the historical Merkle state tree is organized into an LSM tree data structure and stored in the database.

Optionally, the database is a key-value database; a data node on the Merkle state tree is stored in the database in a form of a key-value pair, where a key of a data node on the current Merkle state tree is a node ID of the data node; and a key of a data node on the historical Merkle state tree is a hash value of data content included in the data node.

Optionally, the database is a LevelDB database, or a database based on a LevelDB architecture.

Optionally, the database is a Rocksdb database based on the LevelDB architecture.

Optionally, the Merkle tree is a Merkle tree variant that integrates a tree structure of a Trie dictionary tree.

Optionally, the Merkle state tree is a Merkle Patricia Tree state tree.

The present specification further provides an apparatus for restoring state data of a blockchain, where account state data in the blockchain is organized into a Merkle state tree and stored in a database; the Merkle state tree includes a current Merkle state tree obtained by organizing a latest account state of each blockchain account, and a historical Merkle state tree obtained by organizing a historical account state of each blockchain account; and the apparatus includes the following: a determining module, configured to determine a target block to be restored, where the target block is any historical block preceding a latest block of the blockchain; and a restoration module, configured to iteratively execute state restoration logic until a latest account state corresponding to each blockchain account on a current Merkle state tree of the latest block is restored to a historical account state corresponding to each blockchain account on a historical Merkle state tree of the target block, where the state restoration logic includes the following: determining a target account associated with a transaction in the latest block and querying a historical account state corresponding to the target account on a historical Merkle state tree of a previous block of the latest block; and modifying a latest account state corresponding to the target account on the current Merkle state tree of the latest block as the historical account state corresponding to the target account on the historical Merkle state tree of the previous block, and redetermining the previous block as the latest block after completion of the modification.

Optionally, the determining module is configured to: re-execute the transaction in the latest block to determine the target account associated with the transaction in the latest block; or query a read-write set corresponding to the latest block to determine the target account associated with the transaction in the latest block; and the restoration module is configured to: query the historical account state corresponding to the target account on the historical Merkle state tree of the previous block of the latest block; or query, in a read-write set corresponding to the previous block of the latest block, the historical account state corresponding to the target account on the historical Merkle state tree of the previous block of the latest block.

Optionally, the restoration module is further configured to: before iteratively executing the state restoration logic, determine whether the total number of transactions included from a genesis block of the blockchain to the target block is greater than the total number of transactions included from the target block to the latest block; and if yes, further iteratively execute the state restoration logic.

Optionally, the apparatus further includes the following: a generation module, configured to: after a transaction in any block in the blockchain is executed, generate an updated data node corresponding to a current Merkle state tree of the block and a historical data node corresponding to a historical Merkle state tree of the block based on a latest account state of a target account associated with the transaction in the block; a modification module, configured to modify and update a data node corresponding to the target account on a current Merkle state tree of a previous block of the block based on the generated updated data node, to obtain the current Merkle state tree of the block; and a creation module, configured to create a historical Merkle state tree for the block based on the generated historical data node and a data node other than the multiplexed data node corresponding to the target account on a historical Merkle state tree of the previous block of the block.

Optionally, the data node on the current Merkle state tree is organized into a B+ tree data structure and stored in the database; and the data node on the historical Merkle state tree is organized into an LSM tree data structure and stored in the database.

Optionally, the database is a key-value database; a data node on the Merkle state tree is stored in the database in a form of a key-value pair, where a key of a data node on the current Merkle state tree is a node ID of the data node; and a key of a data node on the historical Merkle state tree is a hash value of data content included in the data node.

Optionally, the database is a LevelDB database, or a database based on a LevelDB architecture.

Optionally, the database is a Rocksdb database based on the LevelDB architecture.

Optionally, the Merkle tree is a Merkle tree variant that integrates a tree structure of a Trie dictionary tree.

Optionally, the Merkle state tree is a Merkle Patricia Tree state tree.

In the previous technical solutions, in a blockchain model that allows the account state data to be organized into the current Merkle state tree and the historical Merkle state tree, the latest account state corresponding to each blockchain account on the current Merkle state tree of the latest block can be rolled back stably and efficiently to the historical account state corresponding to each blockchain account on the historical Merkle state tree of any historical block preceding the latest block.

DESCRIPTION OF IMPLEMENTATIONS

Figure 1:
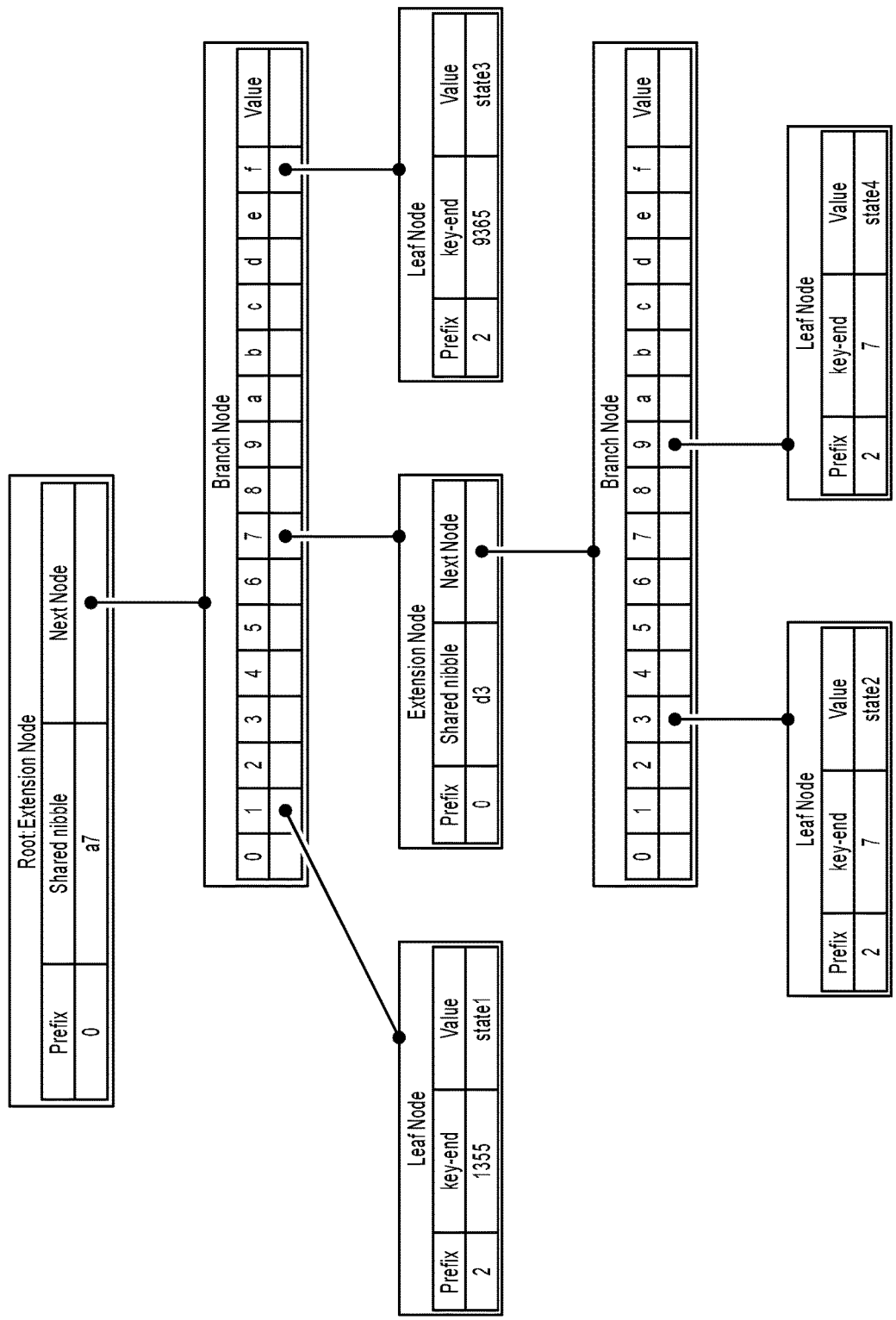
FIG. 1 is a schematic diagram of organizing account state data of a blockchain into an MPT state tree, according to an example implementation.

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that the steps of the corresponding method are not necessarily performed in the order shown and described in the present specification in other implementations. In some other implementations, the method can include more or less steps than those described in the present specification. In addition, a single step described in the present specification can be decomposed into multiple steps in other implementations for description; and multiple steps described in the present specification can be combined into a single step for description in other implementations.

Blockchains are generally classified into three types: public blockchain, private blockchain, and consortium blockchain. In addition, there can be a combination of the previous multiple types, such as private blockchain+consortium blockchain, consortium blockchain+public blockchain, etc.

The public blockchain has the highest degree of decentralization. The public blockchain is represented by bitcoins and Ethereum. Participants joining the public blockchain (also referred to as nodes in the blockchain) can read data records on the blockchain, participate in transactions, and contend for the accounting right in new blocks. Furthermore, nodes can join or exit the network freely and perform related operations.

On the contrary, in the private blockchain, write permissions of the network are controlled by a certain organization or institution, and the data read permissions are specified by the organization. In short, the private blockchain can be a weakly-centralized system, which imposes strict restrictions on nodes and has fewer nodes. Such type of blockchain is more suitable for use within a particular institution.

The consortium blockchain is a blockchain between the public blockchain and the private blockchain, and can implement "partial decentralization". Each node in the consortium blockchain usually has its corresponding physical institution or organization. Nodes join the network through authorization and form a stakeholder consortium to jointly maintain blockchain operation.

Based on its basic characteristics, the blockchain usually consists of several blocks. Each of these blocks records a timestamp corresponding to a creation time of the block. All the blocks form a temporally ordered data chain by strictly following the timestamps recorded in the blocks.

Real data produced in the physical world can be constructed as a standard transaction supported by the blockchain, and then published to the blockchain. A node device in the blockchain performs consensus processing on a received transaction, and after the consensus is reached, a node device serving as an accounting node in the blockchain packages the transaction into a block for persistent certificate storage in the blockchain.

The consensus algorithms supported in the blockchain can include the following: a first-type consensus algorithm in which a node device needs to contend for the accounting right of each round of accounting period, for example, consensus algorithms such as proof of work (POW), proof of stake (POS), and delegated proof of stake (DPOS); second-type consensus algorithm in which an accounting node is elected in advance for each round of accounting period (there is no need to contend for the accounting right), for example, consensus algorithms such as practical *Byzantine* fault tolerance (PBFT).

In a blockchain network using the first-type consensus algorithm, all node devices contending for the accounting right can execute a transaction after receiving the transaction. One of the node devices that contend for the accounting right can win the current round of accounting right contention and become an accounting node. The accounting node can package the received transaction together with other transactions to generate a latest block, and send the generated latest block or a block header of the latest block to other node devices for consensus.

In a blockchain network using the second-type consensus algorithm, the node device having the accounting right has been agreed on before the current round of accounting. Therefore, after receiving a transaction, the node device can send the transaction to the accounting node if the node device is not the accounting node of the current round. The accounting node of the current round can execute the transaction when or before the transaction is packaged with other transactions to generate the latest block. After generating the latest block, the accounting node can send the latest block or a block header of the latest block to other node devices for consensus.

As described above, regardless of which type of consensus algorithm shown above is used by the blockchain, the accounting node of the current round can package the received transaction to generate the latest block, and send the generated latest block or the block header of the latest block to other node devices for consensus verification. If the verification on the latest block or the block header of the latest block received by other node devices succeeds, the latest block can be appended to the end of the original blockchain, thereby completing the blockchain accounting process. When verifying a new block or block header that is sent by the accounting node, other nodes can also execute the transaction included in the block.

Account is an important concept in the blockchain field. Ethereum is used as an example. The Ethereum usually classifies accounts into an external account and a contract account. The external account is an account directly controlled by a user, which is also referred to as a user account. The contract account is an account that is created by the user through the external account and includes contract code (i.e., a smart contract).

Certainly, for some blockchain models (such as the Blockchain as a Service (BaaS)) derived from an Ethereum-based architecture, account types supported by the blockchain can be further expanded, which is not particularly limited in the present specification.

For the accounts in the blockchain, states of the accounts are usually maintained by using a structure. After a transaction in a block is executed, a state of an account associated with the transaction in the blockchain usually changes.

Ethereum is used as an example. The structure of the account generally includes fields such as Balance, Nonce, Code, and Storage.

The Balance field is used to maintain a current account balance of the account.

The Nonce field is used to maintain the number of transactions for the account. The Nonce field is a counter that is used to ensure that each transaction can be processed only once, effectively preventing a replay attack.

The Code field is used to maintain contract code of the account. In practice, the Code field usually maintains only a hash value of the contract code, and so the Code field is usually referred to as the Codehash field.

The Storage field is used to maintain storage content of the account (the default field value is null). Independent storage space is usually allocated to a contract account to store the storage content of the contract account. The independent storage space is usually referred to as account storage of the contract account. The storage content of the contract account is usually constructed as a data structure of a Merkle Patricia Trie (MPT) tree and stored in the previous independent storage space. The MPT tree constructed based on the storage content of the contract account is usually referred to as a Storage tree. The Storage field usually maintains only the root node of the Storage tree, and so the Storage field is usually referred to as a StorageRoot field.

For the external account, the field values of both the Code field and the Storage field shown above are null.

For most blockchain models, data is usually stored and maintained by using the Merkle tree, or by using a data structure based on the Merkle tree. Ethereum is used as an example. The Ethereum uses the MPT tree (a Merkle tree variant) as a form of data organization to organize and manage important data such as an account state and transaction information.

Three MPT trees, namely, the MPT state tree, the MPT transaction tree, and the MPT receipt tree, are designed in the Ethereum for the data that needs to be stored and maintained in the blockchain. In addition to the previous three MPT trees, there is actually a Storage tree constructed based on the storage content of the contract account.

The MPT state tree is an MPT tree obtained by organizing account state data of all accounts in the blockchain. The MPT transaction tree is an MPT tree obtained by organizing transaction data in the blockchain. The MPT receipt tree is an MPT tree obtained by organizing transaction receipts corresponding to each transaction generated after execution of the transaction in a block. The hash values of the root nodes of the MPT state tree, the MPT transaction tree, and the MPT receipt tree shown above are eventually added to block headers of the corresponding blocks.

Each of the MPT transaction tree and the MPT receipt tree corresponds to a block, that is, each block has its own MPT transaction tree and MPT receipt tree. The MPT state tree is a global MPT tree, which does not correspond to a specific block, but covers the account state data of all accounts in the blockchain.

The MPT transaction tree, the MPT receipt tree, and the MPT state tree obtained through organization are all eventually stored in a key-value database (e.g., LevelDB) using a multi-level data storage structure.

The above-mentioned database using the multi-level data storage structure usually can be divided into n levels of data storage. For example, all the levels of data storage can be sequentially set to L0, L1, L2, L3, . . . , and L(n−1). For all the levels of data storage in the above-mentioned database, a smaller level number generally indicates a higher level. For example, L0 stores data of several latest blocks, L1 stores data of several second latest blocks, and so on.

The read/write performance of the storage media corresponding to all levels of data storage can be usually different. For example, the read/write performance of a storage medium corresponding to a high level (i.e., a small level number) of data storage can be higher than the read/write performance of a storage medium corresponding to a low level of data storage. In practice, a storage medium with high storage costs and good storage performance can be used for a high level of data storage; a storage medium with low unit costs and a large capacity can be used for a low level of data storage.

In practice, with an increase of block numbers (also referred to as a block height) in the blockchain, the data stored in the database includes a large amount of historical data. Moreover, data in a block with a smaller block number indicates a longer retention time and less importance. Therefore, in order to reduce overall storage costs, data of different block heights can be usually "treated differently". For example, data in a block with a smaller block number can be stored on a lower-cost storage medium, and data in a block with a larger block number can be stored on a higher-cost storage medium.

It is worthwhile to note that, each time a latest block is generated in the blockchain, after a transaction in the latest block is executed, an account state of a related account (either an external account or a contract account) of the executed transaction in the blockchain will usually change accordingly.

For example, after a "transfer transaction" in a block is executed, balances of transfer-out and transfer-in accounts associated with the "transfer transaction" (that is, field values of the Balance field for these accounts) will usually change accordingly.

After the transaction in the latest block generated in the blockchain is executed, because an account state in the current blockchain changes, the node device needs to construct an MPT state tree based on current account state data of all accounts in the blockchain to maintain the latest states of all accounts in the blockchain.

To be specific, each time a latest block is generated in the blockchain and a transaction in the latest block is executed, the account state in the blockchain changes, and the node device needs to reconstruct an MPT state tree based on the latest account state data of all accounts in the blockchain.

In other words, each block in the blockchain has one corresponding MPT state tree. The MPT state tree maintains the latest account state of all accounts in the blockchain after the transaction in the block is executed.

FIG. 1 is a schematic diagram of organizing account state data of a blockchain into an MPT state tree, according to the present specification.

The MPT tree is an improved Merkle tree variant that integrates the advantages of two tree structures: the Merkle tree and the Trie dictionary tree (also referred to as a prefix tree).

The MPT tree generally includes three types of data nodes: leaf node, extension node, and branch node.

The leaf node is a key-value pair denoted as [key, value], where the key represents a special hexadecimal encoding character and the value represents state data of an account address corresponding to the leaf node (that is, the structure shown above). The extension node is also a key-value pair denoted as [key, value], where the key also represents a special hexadecimal encoding character, but the value represents a hash value (hash pointer) of another node. In other words, the extension node can be linked to the another node by using the hash pointer.

The branch node includes 17 elements. The first 16 elements correspond to 16 possible hexadecimal characters in the key. The other one character corresponds to one nibble (half byte). If one [key, value] pair terminates at the branch node, the branch node can act as a leaf node, and the last element represents the value of the leaf node. Conversely, the last element of the branch node can be null.

Because characters on a search path from the root node to a leaf node on the MPT tree forms a complete account address, the branch node can be either a terminating node or an intermediate node of the previous search path.

Assume that the account state data that needs to be organized into the MPT state tree is shown in Table 1.

TABLE 1

| Account address (key) | | | | | | | Account state (value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a string of several hexadecimal characters. The account state is a structure consisting of the previous fields such as Balance, Nonce, Code, and Storage.

Finally, the MPT state tree obtained by organizing the account state data in Table 1 is shown in FIG. 1. The MPT state tree consists of four leaf nodes, two branch nodes, and two extension nodes.

In FIG. 1, the prefix field is a prefix field common to the extension node and the leaf node. Different field values of the prefix field can be used to represent different node types.

For example, the value 0 of the prefix field represents an extension node that includes even nibbles. As described above, a nibble represents a half byte and consists of four binary bits. One nibble can correspond to one character that constitutes an account address. The value 1 of the prefix field represents an extension node that includes odd nibbles. The value 2 of the prefix field represents a leaf node that includes even nibbles. The value 3 of the prefix field represents a leaf node that includes odd nibbles.

The branch node does not have the prefix field because it is a parallel prefix node with a single nibble.

The Shared nibble field in an extension node corresponds to a key value of a key-value pair included in the extension node, and represents a common character prefix between account addresses. For example, all account addresses in the previous table have a common character prefix a7. The Next Node field is filled with a hash value (hash pointer) of a next node.

The hexadecimal character 0-f field in the branch node corresponds to a key value of a key-value pair included in the branch node. If the branch node is an intermediate node of the account address on the search path on the MPT tree, the Value field of the branch node can be null. The 0-f field is filled with a hash value of a next node.

Key-end in the leaf node corresponds to a key value of a key-value pair included in the leaf node, and represents the last few characters of the account address. The key values of all nodes on the search path from the root node to the leaf node form a complete account address. The Value field of the leaf node is filled with the account state data corresponding to the account address. For example, the structure consisting of the previous fields such as Balance, Nonce, Code, and Storage can be coded and used to populate the Value field of the leaf node.

Further, a node on the MPT state tree shown in FIG. 1 is finally stored in the database in a form of a key-value pair.

When the node on the MPT state tree is stored in the database, the key in the key-value pair of the node on the MPT state tree can be a hash value of data content included in the node. The value in the key-value pair of the node on the MPT state tree is the data content included in the node.

To be specific, when the node on the MPT state tree is stored in the database, the hash value of the data content included in the node can be calculated (that is, the hash value is calculated for the node as a whole). A key-value pair is generated by using the calculated hash value as the key and using the data content included in the node as the value. The generated key-value pair is then stored in the database.

Figure 2:
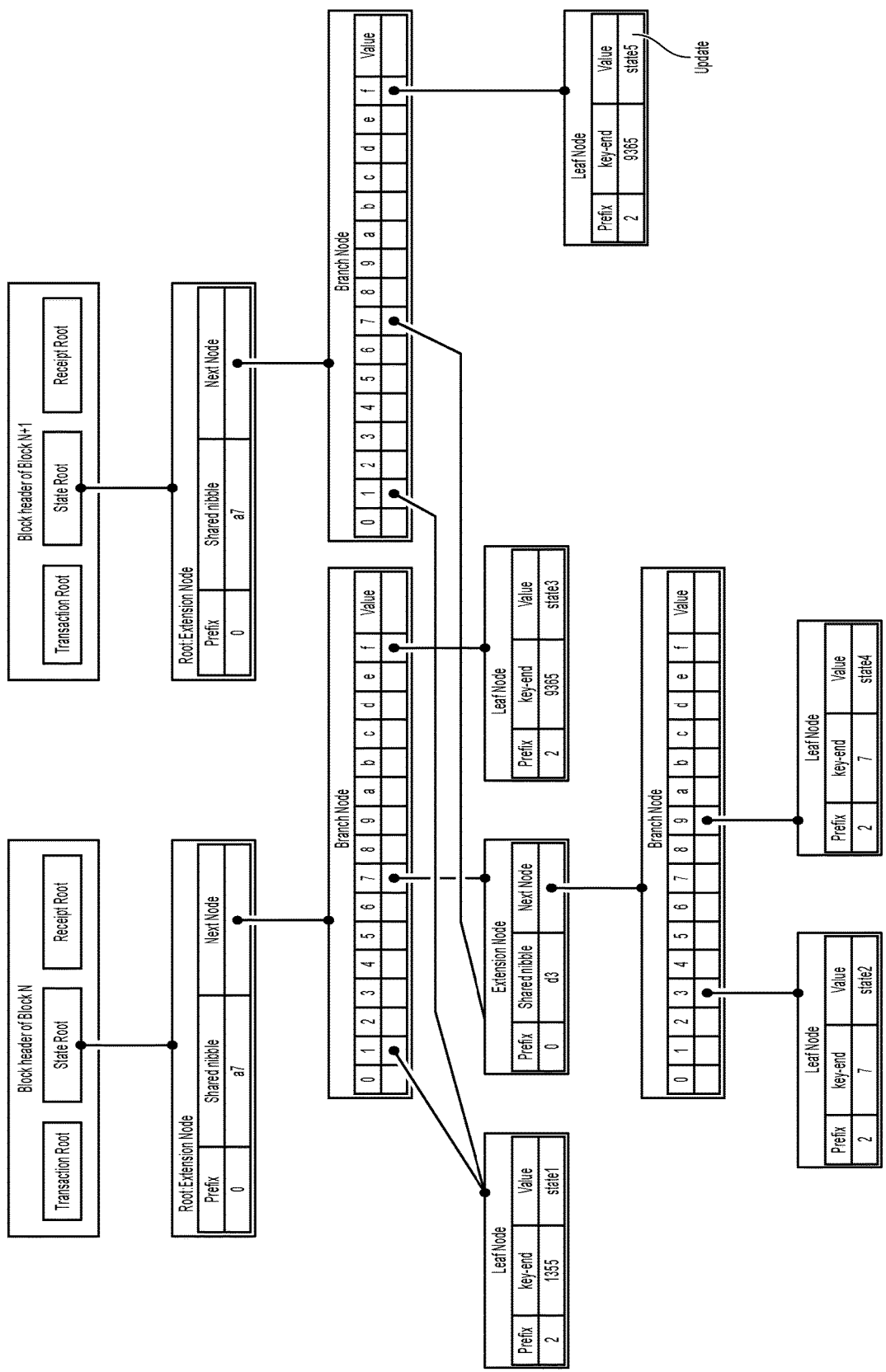
FIG. 2 is a schematic diagram illustrating node multiplexing on an MPT state tree, according to an example implementation.

Because the node on the MPT state tree is stored by using the hash value of the data content included in the node as the key and using the data content included in the node as the value, content addressing can usually be performed by using the hash value of the data content included in the node as the key when the node on the MPT state tree needs to be queried. Through "content addressing", some nodes with "duplicate content" usually can be "multiplexed" to save data storage space. FIG. 2 is a schematic diagram illustrating node multiplexing on an MPT state tree, according to the present specification.

It is worthwhile to note that, in practice, after a transaction in a latest block generated in a blockchain is executed, it is possible that only account states of some accounts change. Therefore, when an MPT state tree is constructed, it is not necessary to reconstruct a complete MPT state tree based on the current state data of all accounts in the blockchain, but only to update the nodes corresponding to some accounts whose account states change on the basis of an MPT state tree corresponding to a block preceding the latest block.

For nodes corresponding to accounts whose account states have not changed on the MPT state tree, because data of these nodes is not updated, the corresponding nodes on the MPT state tree corresponding to the block preceding the latest block can be directly multiplexed.

As shown in FIG. 2, assume that the account state data in Table 1 is the latest account state of all accounts on the blockchain after the transaction in Block N is executed. The MPT state tree obtained by organizing the account state data in Table 1 is still shown in FIG. 1.

Assume that after the transaction in Block N+1 is executed, a state of the account with the account address "a7f9365" in Table 1 is updated from "state3" to "state5". In such case, when the MPT state tree is updated in Block N+1, it is not necessary to reconstruct an MPT state tree based on the current state data of all accounts in the blockchain after the transaction in Block N+1 is executed.

In such case, it is possible that only a value of a leaf node whose "key-end" is "9365" on the MPT state tree corresponding to Block N (that is, the MPT state tree shown in FIG. 1) is updated from "state3" to "state5", and hash pointers of all nodes on the path from the root node to the leaf node are then updated.

In other words, when the leaf node on the MPT state tree is updated, the hash pointers of all nodes on the path from the root node to the leaf node will be updated accordingly because the hash value of the leaf node as a whole is updated.

For example, referring back to FIG. 2, in addition to updating the value in the leaf node whose "key-end" is "9365", the hash pointer to the leaf node that is populated in the f field of the previous branch node of the leaf node needs to be updated. Further, tracing can be performed toward the root node, and the hash pointer to the branch node that is populated in the "Next Node" field of the previous root extension node of the branch node is updated.

Except the previous updated nodes, for other nodes that are not updated, corresponding nodes on the MPT state tree of Block N can be directly multiplexed.

Because the MPT tree corresponding to Block N needs to be preserved as historical data, when the MPT state tree is updated in Block N+1, the updated nodes are not directly modified and updated on the basis of the original nodes on the MPT state tree corresponding to Block N, but are re-created on the MPT tree corresponding to Block N+1.

In other words, only a few updated nodes need to be re-created on the MPT state tree corresponding to Block N+1. For other nodes that are not updated, corresponding nodes on the MPT state tree corresponding to Block N can be directly multiplexed.

For example, as shown in FIG. 2, for the MPT state tree corresponding to Block N+1, it is actually necessary to re-create only one extension node serving as the root node, one branch node, and one leaf node. For nodes that are not updated, nodes can be "multiplexed" by adding a hash pointer to the corresponding node on the MPT state tree corresponding to Block N in these re-created nodes on the MPT state tree. The nodes on the MPT state tree corresponding to Block N before update will be stored as historical account state data. For example, the "key-end" shown in FIG. 2 is "9365" and the leaf node with the value "state3" is preserved as historical data.

In the previous example, content of a few nodes on the MPT state tree of Block N+1 is updated so that most nodes of the previous block Block N can be "multiplexed". In practice, the MPT state tree of Block N+1 can include a newly added node in comparison with the previous block Block N. In such case, the newly added node cannot be "multiplexed" directly from the MPT tree of the previous block Block N, but can be "multiplexed" from an MPT state tree of a block preceding the previous block.

For example, the newly added node on the MPT state tree of Block N+1 does not appear on the MPT state tree of Block N, but can appear on the MPT state tree of the block preceding the previous block, for example, appears on an MPT state tree of Block N−1. Therefore, for the newly added node on the MPT state tree of Block N+1, the corresponding node on the MPT state tree of Block N−1 can be directly multiplexed.

Many Merkle trees using "content addressing" represented by MPT trees can multiplex data nodes with "duplicate content" to save the database storage space of account state data in the blockchain. However, with an increase of data, a large amount of historical state data is redundant, which will degrade access performance of the Merkle state tree, and eventually affect the Transactions Per Second (TPS) indicator of the blockchain platform.

For example, in practice, because there is node multiplexing on the Merkle tree using "content addressing" represented by the MPT tree, for many data nodes on the Merkle state tree of the latest block, data nodes on the Merkle state tree corresponding to the previous historical block are usually multiplexed. As a result, the latest account state data of many blockchain accounts maintained on the Merkle state tree of the latest block is actually "scattered" in numerous historical account state data. Therefore, a large amount of historical state data needs to be traversed to search for the latest account state of each blockchain account, affecting access performance of the Merkle state tree.

Based on the previous description, in order to improve the access performance of the Merkle state tree, some blockchain models usually support both the current Merkle state tree and the historical Merkle state tree.

In such type of blockchain model, the account state data in the blockchain can still be organized into the Merkle state tree and stored in the database. The Merkle state tree can include the current Merkle state tree and the historical Merkle state tree.

The current Merkle state tree is a Merkle state tree obtained by organizing the latest account state of each blockchain account. The historical Merkle state tree is a Merkle state tree obtained by organizing the historical account state of each blockchain account. Each block has one corresponding current Merkle state tree and one corresponding historical Merkle state tree.

Further, after a transaction in any block in the blockchain is executed, on the one hand, an updated data node corresponding to the current Merkle state tree of the block can be generated based on the updated latest account state of the target account associated with the transaction in the block; on the other hand, a historical data node corresponding to the historical Merkle state tree of the block can be generated based on the historical account state of the target account before update.

After the previous updated data node and historical data node are generated, a data node corresponding to the target account on a current Merkle state tree of a previous block of the block can be modified and updated based on the generated updated data node, to obtain the current Merkle state tree of the block.

A historical Merkle state tree is created for the block based on the generated historical data node and a data node other than the multiplexed data node corresponding to the target account on a historical Merkle state tree of the previous block of the block.

As such, there is no multiplexing relationship of data nodes between the current Merkle state tree and the historical Merkle state tree. The current Merkle state tree maintains only the latest account state of each blockchain account, and the historical Merkle state tree maintains only the historical account state of each blockchain account. Therefore, only the current Merkle state tree of the previous block needs to be traversed to search for the latest account state of each blockchain account. As such, the latest account states of these accounts after execution of the transaction in the previous block can be identified, thereby improving access performance of the Merkle state tree.

In practice, when a node device in the blockchain is shut down, the node device usually needs to roll back the latest account state corresponding to each blockchain account on the current Merkle state tree of the latest block to the historical account state corresponding to each blockchain account on the historical Merkle state tree of any historical block preceding the latest block after the node device is recovered from downtime.

Therefore, in the blockchain model that supports both the current Merkle state tree and the historical Merkle state tree, how to stably and efficiently roll back the latest account state corresponding to each blockchain account on the current Merkle state tree of the latest block to the historical account state corresponding to each blockchain account on the historical Merkle state tree of any historical block preceding the latest block after the node device in the blockchain is recovered from downtime is a problem to be solved urgently in such type of blockchain model.

In related technologies, the latest account state of each blockchain account on the current Merkle state tree of the latest block usually can be rolled back to the historical account state corresponding to each blockchain account on the historical Merkle state tree of any target historical block preceding the latest block by using the following methods:

Method 1:

Assume that the previous target historical block is denoted as block N. The historical Merkle state tree of block N can be created by re-executing all transactions included from the genesis block (namely, the first block of the blockchain) to block N, and then the current Merkle state tree of the previous latest block is modified back to the current Merkle state tree of block N. As such, rollback of the state data is completed.

However, in such method, a large number of transactions need to be re-executed, and rollback costs of state data are high.

Method 2:

Assume that the previous target historical block is still denoted as block N. The historical Merkle state tree corresponding to block N can be identified by traversing all historical Merkle state trees stored in the database, and then the current Merkle state tree of the previous latest block is modified back to the current Merkle state tree of block N. As such, rollback of the state data is completed.

However, in such method, all the historical Merkle state trees in the database need to be traversed to identify the data nodes on the historical Merkle state tree corresponding to block N one by one. As a result, rollback costs of state data are still high.

In view of the previous description, the present specification provides the following technical solution: In a blockchain model that supports both a current Merkle state tree and a historical Merkle state tree, a latest account state corresponding to each blockchain account on a current Merkle state tree of a latest block is rolled back stably and efficiently to a historical account state corresponding to each blockchain account on a historical Merkle state tree of any historical block preceding the latest block.

During implementation, after a node device is recovered from downtime, a target block to be restored can be first determined, where the target block can be any historical block preceding a latest block in a blockchain.

For example, in practice, after the node device is recovered from downtime, an administrator can enter a configuration instruction to the node device to specify a block number of the target block that needs to be restored.

Further, the node device can iteratively execute state restoration logic until a latest account state corresponding to each blockchain account on a current Merkle state tree of the latest block is restored to a historical account state corresponding to each blockchain account on a historical Merkle state tree of the previous target block.

The previous state restoration logic can include the following execution logic: determining a target account associated with a transaction in the latest block and querying a historical account state corresponding to the target account on a historical Merkle state tree of a previous block of the latest block; and modifying a latest account state corresponding to the target account on the current Merkle state tree as the historical account state corresponding to the target account on the historical Merkle state tree of the previous block, and redetermining the previous block as the latest block after completion of the modification.

In the previous technical solutions, in a blockchain model that allows the account state data to be organized into the current Merkle state tree and the historical Merkle state tree, the latest account state corresponding to each blockchain account on the current Merkle state tree of the latest block can be rolled back stably and efficiently to the historical account state corresponding to each blockchain account on the historical Merkle state tree of any historical block preceding the latest block.

Figure 3:
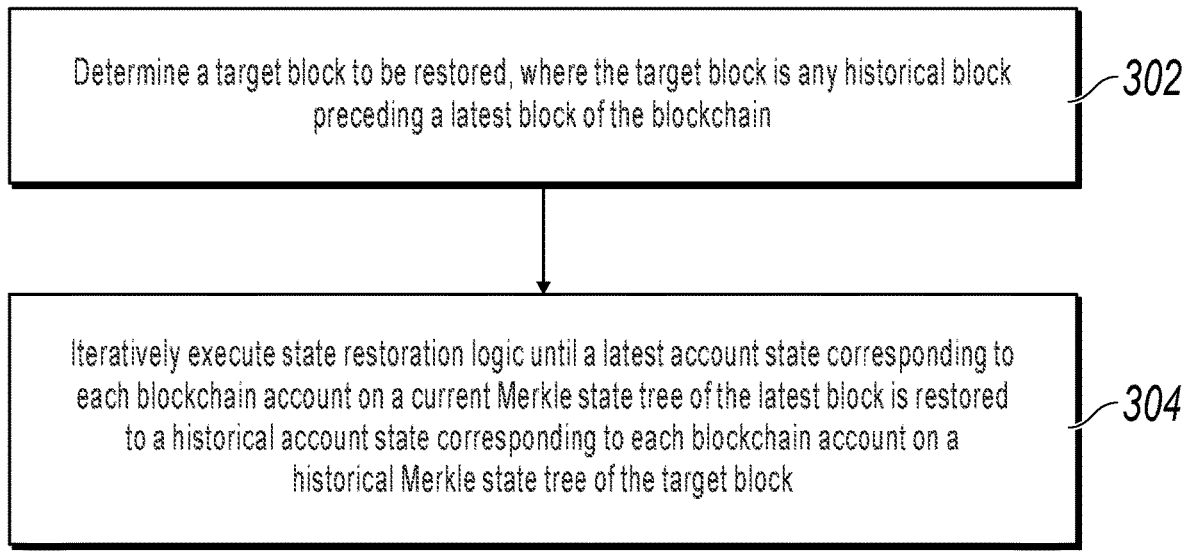
FIG. 3 is a flowchart illustrating a method for restoring state data of a blockchain, according to an example implementation.

FIG. 3 is a flowchart illustrating a method for restoring state data of a blockchain, according to an example implementation. The method is applied to a blockchain node device; account state data in the blockchain is organized into a Merkle state tree and stored in a database; the Merkle state tree includes a current Merkle state tree obtained by organizing a latest account state of each blockchain account, and a historical Merkle state tree obtained by organizing a historical account state of each blockchain account; and the method includes the following steps:

Step 302: Determine a target block to be restored, where the target block is any historical block preceding a latest block of the blockchain.

Step 304: Iteratively execute state restoration logic until a latest account state corresponding to each blockchain account on a current Merkle state tree of the latest block is restored to a historical account state corresponding to each blockchain account on a historical Merkle state tree of the target block.

The state restoration logic includes the following: determining a target account associated with a transaction in the latest block and querying a historical account state corresponding to the target account on a historical Merkle state tree of a previous block of the latest block; and modifying a latest account state corresponding to the target account on the current Merkle state tree of the latest block as the historical account state corresponding to the target account on the historical Merkle state tree of the previous block, and redetermining the previous block as the latest block after completion of the modification.

In a shown implementation, the Merkle tree can include any form of a Merkle tree variant that integrates a tree structure of a Trie dictionary tree.

For example, in practice, the previous Merkle tree can still be the MPT tree that is used by the public blockchain represented by Ethereum. Alternatively, for the blockchain model derived from the Ethereum architecture, the previous Merkle tree can be an improved Merkle tree such as the MPT tree, or can be another form of a Merkle tree variant that integrates a tree structure of a Trie dictionary tree and is similar to the MPT tree, which is not listed one by one in the present specification.

The account state data in the blockchain can be organized into the data structure of the Merkle state tree and stored in the previous database.

For example, the previous Merkle state tree can still be an MPT tree, and the MPT tree data structure can be used to organize the account state data of the blockchain into an MPT state tree.

In the present specification, the Merkle state tree obtained by organizing the account state data in the blockchain can include the current Merkle state tree and the historical Merkle state tree. The current Merkle state tree is a Merkle state tree obtained by organizing the latest account state of each blockchain account. The historical Merkle state tree is a Merkle state tree obtained by organizing the historical account state of each blockchain account.

Each block in the blockchain has one corresponding current Merkle state tree and one corresponding historical Merkle state tree.

It is worthwhile to note that, the current Merkle state tree and the historical Merkle state tree are two independent Merkle state trees; there is no multiplexing relationship of data nodes between the current Merkle state tree and the historical Merkle state tree.

That there is no multiplexing relationship of data nodes between the current Merkle state tree and the historical Merkle state tree means that, the current Merkle state tree of any block in the blockchain includes the data nodes corresponding to all the blockchain accounts, and does not need to multiplex any data node on the historical Merkle state tree of the block or any historical block preceding the block.

For example, in practice, when a current Merkle state tree is created for a certain target block, because the current Merkle state tree of the previous block includes the data nodes corresponding to all the blockchain accounts, some updated data nodes can be directly modified and updated on the basis of the current Merkle state tree of the previous block to obtain the current Merkle state tree of the target block, without a need to multiplex any data node on the historical Merkle state tree of the block or any historical block preceding the block.

However, the historical Merkle state tree of any block in the blockchain can include only a data node corresponding to an account associated with a transaction in the block. For a data node corresponding to a blockchain account other than the account associated with the transaction in the block, a data node on the historical Merkle state tree of any historical block preceding the block can be directly multiplexed. For a specific method for multiplexing a data node, references can still be made to FIG. 2 and the description of the parts related to FIG. 2.

In the present specification, a user client accessing the blockchain can package data into a standard transaction format supported by the blockchain and then publish the data to the blockchain; a node device in the blockchain can, based on the included consensus algorithm and together with other node devices, perform consensus on the transactions published by the user client to the blockchain, so as to generate a latest block for the blockchain. A specific consensus process is omitted here for simplicity.

After the node device in the blockchain executes the transactions in any block in the blockchain, the account state of the target account associated with these executed transactions in the blockchain usually changes accordingly. Therefore, after the transactions in the block are executed, the node device can create the current Merkle state tree and the historical Merkle state tree for the block respectively based on the historical account state of the target account before account update (that is, the account state before the transaction in the latest block is executed) and the latest account state of the target account after account update (that is, the account state after the transaction in the latest block is executed).

It is worthwhile to note that, in the present specification, the node device can either execute the transaction in the latest block generated in the blockchain, or re-execute the transaction in any historical block in the blockchain.

In other words, in the present specification, the node device can create the current Merkle state tree and the historical Merkle state tree for the block respectively based on the historical account state of the target account associated with these executed transactions before account update, and the latest account state of the target account after account update, regardless of whether the node device executes the transaction in the newly generated latest block or re-executes the transaction in any historical block.

In the present specification, after the transaction in any block on the blockchain is executed, the node device can generate an updated data node corresponding to the current Merkle state tree of the block based on the latest account state of the target account associated with the transaction in the block after update.

For example, during implementation, the node device can query the data nodes corresponding to the target account associated with the transaction in the previous block on the current Merkle state tree of the block, and copy the identified data nodes; and then modify and update the values of these copied data nodes based on the latest account state of the target account after update, to obtain the previous updated data node. For the process of searching for and updating the values of the data nodes, references can still be made to FIG. 1 and the description of the parts related to FIG. 1.

Correspondingly, after the transaction in the block is executed, the node device can further generate a historical data node corresponding to the historical Merkle state tree of the block based on the historical account state of the target account associated with the transaction in the block before update.

For example, during implementation, the node device can also query the data nodes corresponding to the target account associated with the transaction in the previous block on the historical Merkle state tree of the block, and copy the identified data nodes; and then modify and update the values of these copied data nodes based on the historical account state of the target account before update, to obtain the previous historical data node.

In a shown implementation, both the updated data node and the historical data node can be represented as a write set.

During execution of a transaction in a block, a node device in a blockchain can first generate a read-write set corresponding to the transaction in the block. The generated read-write set can also be stored in the previous database. For example, in practice, the generated read-write set can be stored as an execution log of the transaction in a receipt corresponding to the transaction.

The previously described read-write set is used to record the account state (i.e., the historical account state before the account update) of the account associated with the transaction before execution of the transaction in the block; and the account state (i.e., the latest account state after the account update) of the account associated with the transaction after execution of the transaction in the block.

For example, the transaction in the block is a transfer transaction. The read-write set corresponding to the transaction in the block can be represented as <account, Balance1, Balance2>, where account represents a transfer account associated with the transaction in the block, Balance1 represents a fund balance of the transfer account before execution of the transfer transaction, and Balance2 represents a fund balance of the transfer account after execution of the transfer transaction.

After the transaction in the block is executed, the node device can further generate a write set corresponding to the Merkle state tree of the block based on the generated read-write set corresponding to the transaction in the block. The write set is used to describe data nodes that need to be written into the Merkle state tree of the block.

It is worthwhile to note that, in the present specification, because any block in the blockchain has a current Merkle state tree and a historical Merkle state tree, after the transaction in the block is executed, the node device can further generate two write sets based on the generated read-write set corresponding to the transaction in the block. One write set corresponds to the current Merkle state tree of the block, and is a data node (i.e., the previous updated data node) that needs to be written into the current Merkle state tree of the block. The other write set corresponds to the current Merkle state tree of the block, and is a data node (i.e., the previous historical data node) that needs to be written into the historical Merkle state tree of the block.

In the present specification, after the node device generates the updated data node corresponding to the current Merkle state tree of the block based on the latest account state of the target account associated with the transaction in the block after update, and generates the historical data node corresponding to the historical Merkle state tree of the block based on the historical account state of the target account associated with the transaction in the block before update, the node device can create the current Merkle state tree and the historical Merkle state tree for the block respectively based on the generated updated data node and the historical data node.

On the one hand, the node device can modify and update some updated data nodes on the basis of the current Merkle state tree of the previous block to create the current Merkle state tree for the block.

In such case, the generated updated data node is the data node that needs to be modified and updated on the current Merkle state tree of the previous block. The node device can query the data node corresponding to the target account on the current Merkle state tree of the previous block of the block, and modify and update the identified data nodes based on the generated updated data node. The current Merkle state tree of the block can be obtained after the modification and update are completed.

For example, during implementation, if the previous updated data node is represented as a write set, the data node corresponding to the target account on the current Merkle state tree of the previous block of the block can be modified and updated based on the write set.

On the other hand, on the basis of the historical Merkle state tree of the previous block, the node device can re-create and add some updated data nodes, and multiplex data nodes other than the data nodes corresponding to the target account on the historical Merkle state tree of the previous block, to create a historical Merkle state tree for the block.

In such case, the previous generated historical data nodes are the data nodes that need to be re-created and added. The node device can query the data nodes other than the data nodes corresponding to the target account on the historical Merkle state tree of the previous block of the block, and multiplex these identified other data nodes; and then can create the historical Merkle state tree for the block based on the generated historical data nodes and the multiplexed other data nodes. For the process of multiplexing the data nodes, references can still be made to FIG. 2 and the description of the parts related to FIG. 2.

For example, during implementation, if the previous historical data node is also represented as a write set, the historical Merkle state tree can be created for the block based on the write set and the data node other than the multiplexed data node corresponding to the target account on the historical Merkle state tree of the previous block of the block.

It can be seen from the previous description that, for the historical Merkle state tree, operations are largely related to writing new historical data nodes into the historical Merkle state tree, and operations of modifying and updating the data nodes are not included. Therefore, the historical Merkle state tree itself does not need high data reading performance.

For the current Merkle state tree, operations are largely related to modifying and updating data nodes. Furthermore, in practice, node devices usually need to frequently invoke the latest account state of each blockchain account maintained in the current Merkle state tree during transaction execution. Therefore, the current Merkle state tree itself needs high data reading performance and data modification performance.

Therefore, in practice, when the historical Merkle state tree is stored in the database, a data structure that needs high write performance and low read performance can be used; when the current Merkle state tree is stored in the database, a data structure that needs high read performance and modification performance and low write performance can be used.

In a shown implementation, the data node on the current Merkle state tree can be organized into a balance+ (B+) tree data structure and stored in the database; and the data node on the historical Merkle state tree can be organized into a log-structured merge (LSM) tree data structure and stored in the database. A specific method for organizing the data node on the current Merkle state tree into the B+ tree data structure, and organizing the data node on the historical Merkle state tree into the LSM tree data structure is not described in detail in the present specification.

In a shown implementation, the database can be a key-value database. For example, in a shown implementation, the database can be a LevelDB database using a multi-level storage structure, or a database based on the LevelDB architecture. For example, the Rocksdb database is a typical database based on the LevelDB database architecture.

In such case, both the current Merkle state tree and the historical Merkle state tree are eventually stored as a key-value pair in the database.

As described above, the historical Merkle state tree still multiplexes the data node on the historical Merkle state tree of the previous block, and the current Merkle state tree does not need to consider the data node multiplexing, but largely relates to modifying the value of the data node. Therefore, based on such characteristic difference, when the data nodes on the current Merkle state tree and the historical Merkle state tree are stored as a key-value pair in the database, differentiated keys can be designed for the current Merkle state tree and the historical Merkle state tree.

In a shown implementation, because the historical Merkle state tree still multiplexes the data node on the historical Merkle state tree of the previous block, when the data node on the historical Merkle state tree is stored as a key-value pair in the database, a hash value of data content included in the data node can still be used as the key.

Because the current Merkle state tree needs to frequently modify the value of the data node, when the data node on the current Merkle state tree is stored as a key-value pair in the database, a node ID of the data node can be used as the key.

In practice, the node ID can be a character prefix corresponding to a path from the root node of the Merkle state tree to the data node, or a node number obtained by mapping the character prefix corresponding to the path from the root node of the Merkle state tree to the data node.

In the present specification, when a node device in the blockchain is shut down, the node device can restore a latest account state corresponding to each blockchain account on a current Merkle state tree of the latest block to a historical account state corresponding to each blockchain account on a historical Merkle state tree of a designated target block after the node device is recovered from downtime. The target block can be any historical block preceding the latest block.

Figure 4:
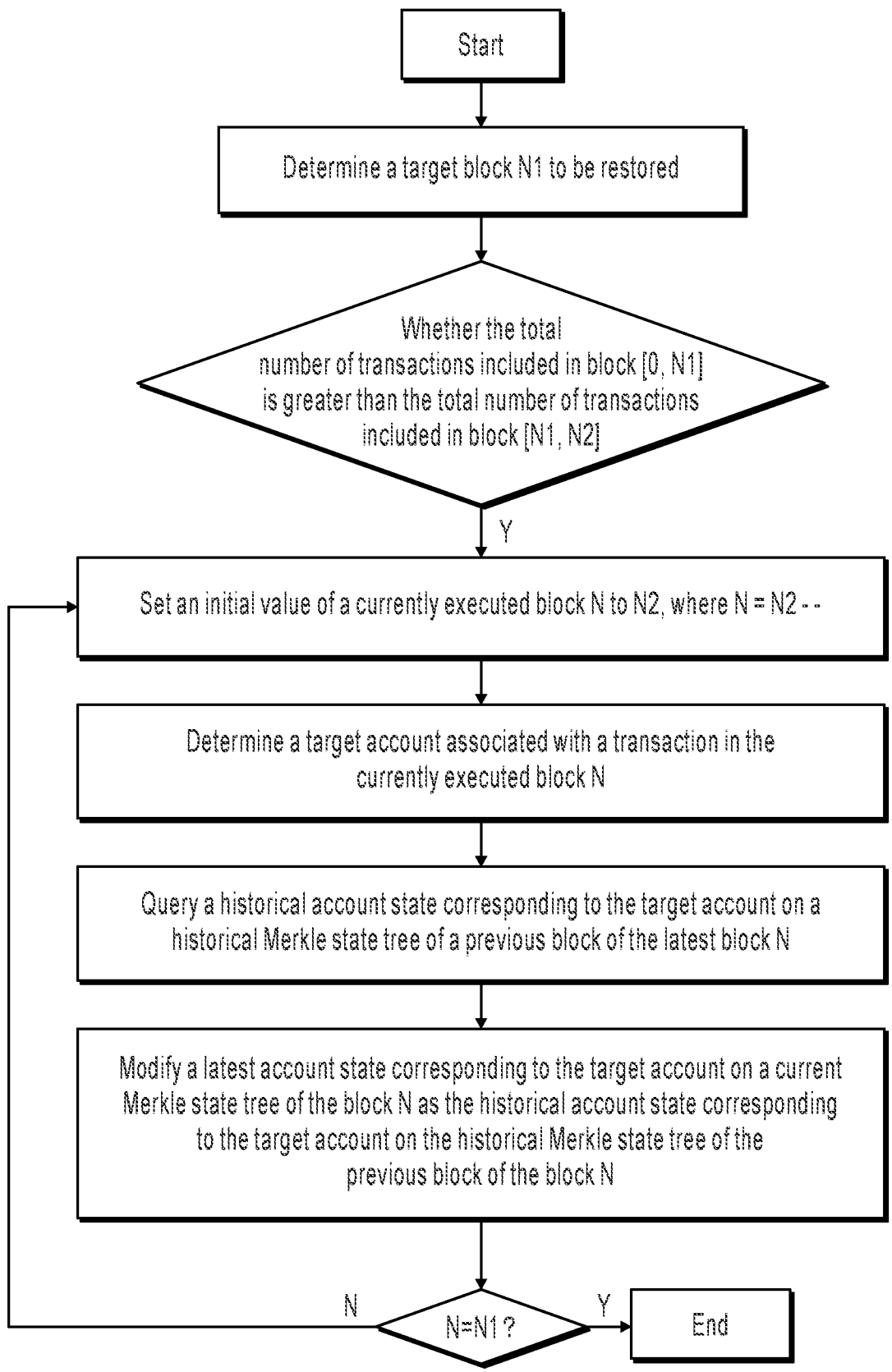
FIG. 4 is a schematic diagram illustrating state rollback for a current Merkle state tree, according to an example implementation.

FIG. 4 is a schematic diagram illustrating state rollback for a current Merkle state tree, according to the present specification.

Assume that the previous target block is denoted as N1, and the previous latest block is denoted as N2.

After being recovered from downtime, the node device can first determine the target block to be restored.

For example, in practice, after the node device is recovered from downtime, an administrator can enter a configuration instruction to specify a block number of the target block that needs to be restored. The node device can obtain the block number of the target block by parsing the configuration instruction entered by the administrator.

In a shown implementation, after determining the target block to be restored, the node device can first determine whether the total number of transactions included from the genesis block of the blockchain to the target block N1 is greater than the total number of transactions included from the target block N1 to the latest block N2.

For example, in an implementation, the block format supported by the previous blockchain can be improved by adding a field to a block header of each block to indicate the total number of transactions included in the block body of the current block. The node device can obtain the total number of transactions included in each block by reading the value recorded in the field in the block header of each block. Then, the node device can count and compare the total number of transactions included from the genesis block of the blockchain to the target block N1, and the total number of transactions included from the target block N1 to the latest block N2.

Referring to FIG. 4, if the node device determines that the total number of transactions included from the genesis block to the target block N1 is less than or equal to the total number of transactions included from the target block N1 to the latest block N2, the node device can still roll back state data based on method 1 or method 2 in the related technologies described above.

On the contrary, if the node device determines that the total number of transactions included from the genesis block to the target block N1 is greater than the total number of transactions included from the target block N1 to the latest block N2, the cost of rolling back the state data based on method 1 or method 2 in the related technologies described above is relatively high. Therefore, the state restoration logic shown in FIG. 4 can be iteratively executed to roll back the state data until a latest account state corresponding to each blockchain account on a current Merkle state tree of the latest block N2 is restored to a historical account state corresponding to each blockchain account on a historical Merkle state tree of the previous target block N1.

Referring to FIG. 4, the following describes in detail the process of iteratively executing the previous state restoration logic to roll back the state data.

Referring back to FIG. 4, the node device can modify the currently executed block N as the latest block N2, that is, an initial value of the currently executed block N is N2. The currently executed block N is a block that is being executed by the state restoration logic at the software level.

After determining the latest block N2 as the currently executed block N, the node device can further determine the target account associated with the transaction in the latest block N2.

The method in which the node device determines the target account associated with the transaction in the latest block N2 is not limited in the present specification.

In a shown implementation, the node device can determine the target account associated with the transaction in the latest block by re-executing the transaction in the latest block N2.

For example, the node device can generate a read-write set corresponding to the transaction in the latest block by re-executing the transaction in the latest block N2, and then determine the target account associated with the transaction in the latest block by reading the account address recorded in the read-write set.

In another shown implementation, if the blockchain model allows a read-write set corresponding to the latest block generated during execution of the transaction in the latest block to be stored in the database, the node device can determine the target account associated with the transaction in the latest block without re-executing the transaction in the latest block, but instead by directly querying the read-write set corresponding to the latest block in the database and then directly reading the data recorded in the read-write set.

Referring back to FIG. 4, after determining the target account associated with the transaction in the latest block N2, the node device can further query the historical account state corresponding to the target account in the historical Merkle state tree of the previous block of the latest block N2.

A specific method in which the node device queries the historical account state corresponding to the target account in the historical Merkle state tree of the previous block of the latest block N2 is not limited in the present specification.

In a shown implementation, the node device can perform query once on the historical Merkle state tree of the previous block of the latest block N2 based on the account address of the target account (equivalent to performing one exact search based on the account address, without a need to traverse the historical Merkle state tree of the previous block), to determine the historical account state corresponding to the target account in the historical Merkle state tree of the previous block of the latest block N2.

In another shown implementation, if the blockchain model allows a read-write set corresponding to the latest block generated during execution of the transaction in the latest block to be stored in the database, the node device can determine the historical account state corresponding to the target account in the historical Merkle state tree of the previous block of the latest block N2 without performing a query action on the historical Merkle state tree of the previous block of the latest block N2, but instead by querying a read-write set corresponding to the previous block of the latest block in the previous database and then reading the data recorded in the read-write set.

After determining the historical account state corresponding to the target account in the historical Merkle state tree of the previous block of the latest block N2, the node device can modify the latest account state corresponding to the target account on the current Merkle state tree of the latest block as the historical account state corresponding to the target account on the historical Merkle state tree of the previous block of the latest block N2.

For example, during implementation, the node device can generate a write set corresponding to the current Merkle state tree of the latest block based on the historical account state corresponding to the target account on the historical Merkle state tree of the previous block of the latest block N2, and then modify and update the data node corresponding to the target account on the current Merkle state tree of the latest block N2 based on the generated write set.

After the node device modifies the latest account state corresponding to the target account on the current Merkle state tree of the latest block as the historical account state corresponding to the target account on the historical Merkle state tree of the previous block of the latest block N2, the latest account state corresponding to each blockchain account on the current Merkle state tree of the latest block N2 has been rolled back to the historical account state corresponding to each blockchain account on the historical Merkle state tree of the previous block of the latest block N2.

In such case, the node device can modify the currently executed block N as the previous block of the latest block N2 again. Then, the node device re-executes the above-described process until the currently executed block N is modified as the target block N1.

It is worthwhile to note that, as shown in FIG. 4, the value of the currently executed block N can be denoted as N=N2-, indicating that the initial value of the currently executed block N is N2. Each time the state restoration logic described above is iteratively executed, the value of the currently executed block N is subtracted by 1 on the basis of the initial value N2. The process in which the node device modifies the currently executed block N as the previous block of the latest block N2 is equivalent to modifying the previous block of the latest block N2 as the latest block again.

By iterating the state restoration logic described above, inverse state rollback can be performed on each block until an account state corresponding to each blockchain account on the current Merkle state tree of the latest block N2 is modified as an account state corresponding to each blockchain account on the historical Merkle state tree of the target block N1.

For example, assume that N1=90 and N2=100. When a latest account state corresponding to each blockchain account on a current Merkle state tree corresponding to block 100 needs to be rolled back to a historical account state corresponding to each blockchain account on a historical Merkle state tree corresponding to block 90, according to the method described above, the currently executed block N is first set to 100. After the latest account state corresponding to each blockchain account on the current Merkle state tree corresponding to block 100 is rolled back to the historical account state corresponding to each blockchain account on the historical Merkle state tree corresponding to block 90 according to the previous method, the currently executed block N is modified as 99 (that is, block 99 is set to the latest block again). The previous process is repeated until the currently executed block N is modified as 90.

In the previous technical solutions, the state data is rolled back by inversely replaying the transactions in the block one by one. Therefore, when the total number of transactions included from the genesis block to the target block N1 is far greater than the total number of transactions included from the target block N1 to the latest block N2, using the previous technical solutions can significantly reduce playback costs in comparison with methods 1 and 2 in the related technologies described above. In a blockchain model that allows the account state data to be organized into the current Merkle state tree and the historical Merkle state tree, the latest account state corresponding to each blockchain account on the current Merkle state tree of the latest block can be rolled back stably and efficiently to the historical account state corresponding to each blockchain account on the historical Merkle state tree of any historical block preceding the latest block.

Corresponding to the previous method implementation, the present application further provides an apparatus implementation.

Corresponding to the previous method implementation, the present specification further provides an apparatus for restoring state data of a blockchain.

The implementation of the apparatus for restoring state data of a blockchain in the present specification can be applied to an electronic device. The apparatus implementation can be implemented by software, or can be implemented by hardware or a combination of software and hardware. For example, the apparatus implementation is implemented by software. A logical apparatus is formed when a processor of an electronic device in which the apparatus is located reads a corresponding computer program instruction in a non-volatile memory into the memory for running.

Figure 5:
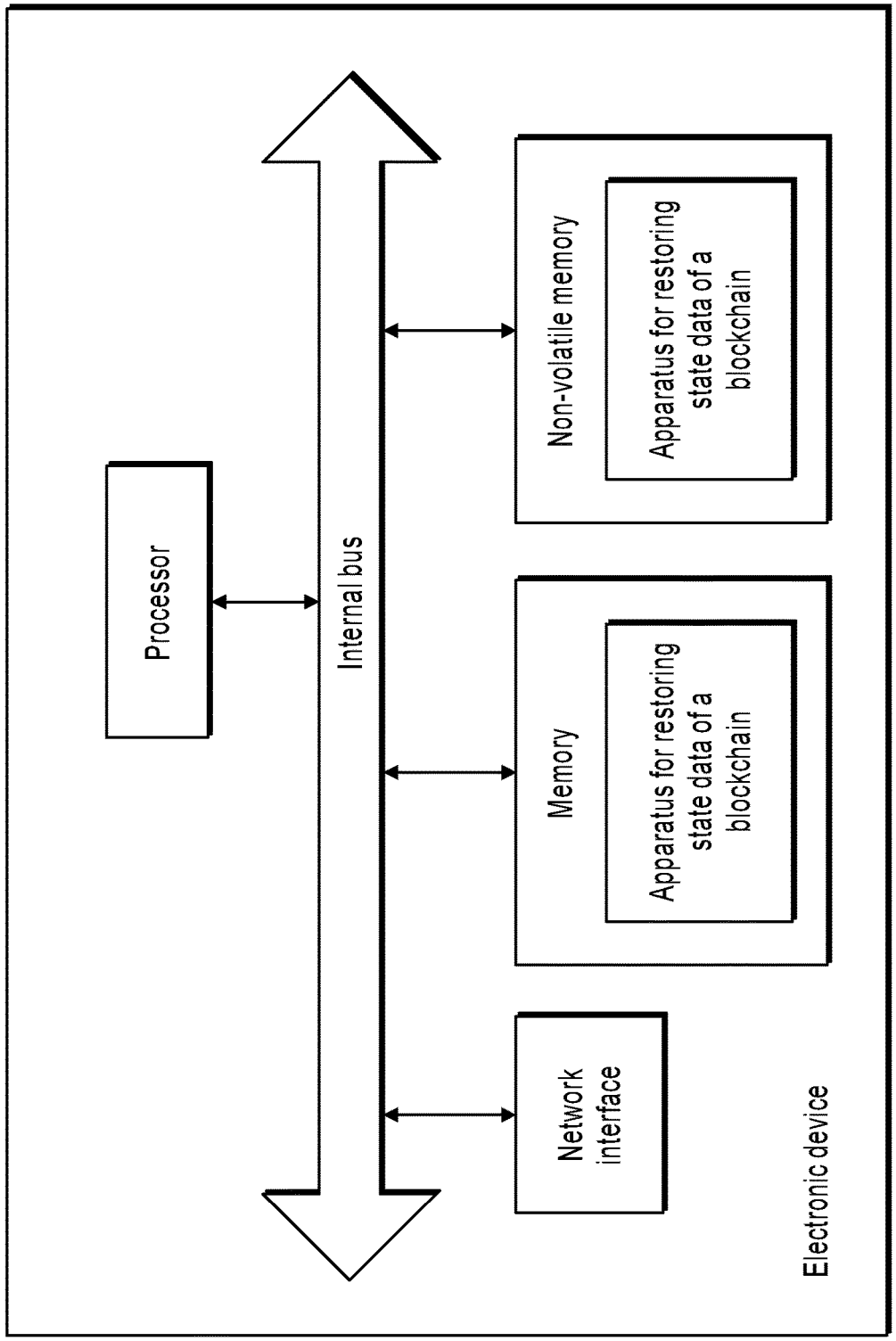
FIG. 5 is a schematic structural diagram illustrating an electronic device, according to an example implementation.

In terms of hardware, FIG. 5 is a diagram of a hardware structure of an electronic device in which an apparatus for restoring state data of a blockchain is located, according to the present specification. In addition to the processor, memory, network interface, and non-volatile memory shown in FIG. 5, the electronic device in which the apparatus is located in the implementation generally can further include other hardware based on an actual function of the electronic device. Details are omitted here for simplicity.

Figure 6:
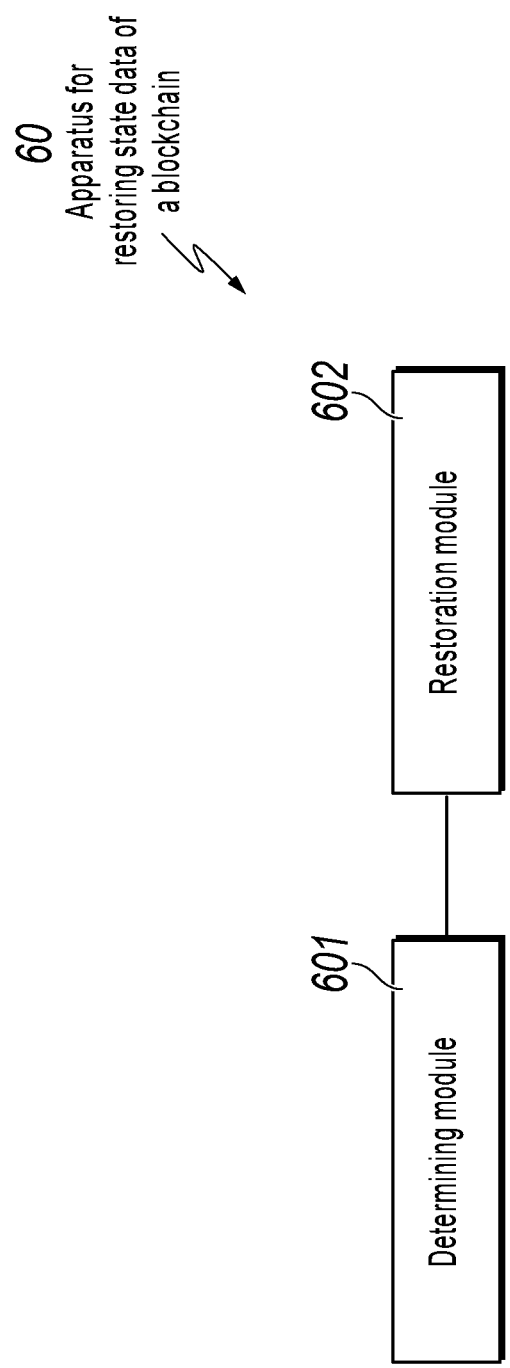
FIG. 6 is a block diagram illustrating an apparatus for restoring a state of a blockchain, according to an example implementation.

FIG. 6 is a block diagram illustrating an apparatus for restoring state data of a blockchain, according to an example implementation of the present specification.

Referring to FIG. 6, an apparatus 60 for restoring state data of a blockchain can be applied to the electronic device shown in FIG. 5. Account state data in the blockchain is organized into a Merkle state tree and stored in a database; the Merkle state tree includes a current Merkle state tree obtained by organizing a latest account state of each blockchain account, and a historical Merkle state tree obtained by organizing a historical account state of each blockchain account; and the apparatus 60 includes the following: a determining module 601, configured to determine a target block to be restored, where the target block is any historical block preceding a latest block of the blockchain; and a restoration module 602, configured to iteratively execute state restoration logic until a latest account state corresponding to each blockchain account on a current Merkle state tree of the latest block is restored to a historical account state corresponding to each blockchain account on a historical Merkle state tree of the target block, where the state restoration logic includes the following: determining a target account associated with a transaction in the latest block and querying a historical account state corresponding to the target account on a historical Merkle state tree of a previous block of the latest block; and modifying a latest account state corresponding to the target account on the current Merkle state tree of the latest block as the historical account state corresponding to the target account on the historical Merkle state tree of the previous block, and redetermining the previous block as the latest block after completion of the modification.

In the present implementation, the determining module 601 is configured to: re-execute the transaction in the latest block to determine the target account associated with the transaction in the latest block; or query a read-write set corresponding to the latest block to determine the target account associated with the transaction in the latest block.

The restoration module 602 is configured to: query the historical account state corresponding to the target account on the historical Merkle state tree of the previous block of the latest block; or query, in a read-write set corresponding to the previous block of the latest block, the historical account state corresponding to the target account on the historical Merkle state tree of the previous block of the latest block.

In the present implementation, the restoration module 602 is further configured to: before iteratively executing the state restoration logic, determine whether the total number of transactions included from a genesis block of the blockchain to the target block is greater than the total number of transactions included from the target block to the latest block; and if yes, further iteratively execute the state restoration logic.

In the present implementation, the apparatus 60 further includes the following: a generation module 603 (not shown in FIG. 6), configured to: after a transaction in any block in the blockchain is executed, generate an updated data node corresponding to a current Merkle state tree of the block and a historical data node corresponding to a historical Merkle state tree of the latest block based on a latest account state of a target account associated with the transaction in the block; a modification module 604 (not shown in FIG. 6), configured to modify and update a data node corresponding to the target account on a current Merkle state tree of a previous block of the block based on the generated updated data node, to obtain the current Merkle state tree of the block; and a creation module 605 (not shown in FIG. 6), configured to create a historical Merkle state tree for the block based on the generated historical data node and a data node other than the multiplexed data node corresponding to the target account on a historical Merkle state tree of the previous block of the block.

In the present implementation, the data node on the current Merkle state tree is organized into a B+ tree data structure and stored in the database; and the data node on the historical Merkle state tree is organized into an LSM tree data structure and stored in the database.

In the present implementation, the database is a key-value database; a data node on the Merkle state tree is stored in the database in a form of a key-value pair, where a key of a data node on the current Merkle state tree is a node ID of the data node; and a key of a data node on the historical Merkle state tree is a hash value of data content included in the data node.

In the present implementation, the database is a LevelDB database, or a database based on a LevelDB architecture.

In the present implementation, the database is a Rocksdb database based on the LevelDB architecture.

In the present implementation, the Merkle tree is a Merkle tree variant that integrates a tree structure of a Trie dictionary tree.

In the present implementation, the Merkle state tree is a Merkle Patricia Tree state tree.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for restoring state data of a blockchain associated with a plurality of blockchain accounts, wherein:
   account state data in the blockchain is organized into a Merkle state tree and stored in a database; and
   the Merkle state tree comprises:
   a current Merkle state tree obtained by organizing a latest account state of each blockchain account of the plurality of blockchain accounts, and
   a historical Merkle state tree obtained by organizing a historical account state of the each blockchain account; and
   the method comprises:
   determining a target block to be restored, wherein the target block is a historical block preceding a latest block of the blockchain; and
   iteratively executing state restoration logic until a latest account state corresponding to each blockchain account on a current Merkle state tree of the latest block is restored to a historical account state corresponding to each blockchain account on a historical Merkle state tree of the target block, wherein executing the state restoration logic comprises:
   determining a target account associated with a transaction in the latest block;

querying a historical account state corresponding to the target account on a historical Merkle state tree of a previous block of the latest block;

modifying a latest account state corresponding to the target account on the current Merkle state tree of the latest block to be the historical account state corresponding to the target account on the historical Merkle state tree of the previous block; and after the modifying, redetermining the previous block as the latest block.

2. The computer-implemented method according to claim 1, wherein:

the determining a target account associated with a transaction in the latest block comprises:

re-executing the transaction in the latest block to determine the target account associated with the transaction in the latest block; or querying a read-write set corresponding to the latest block to determine the target account associated with the transaction in the latest block; and the querying a historical account state corresponding to the target account on a historical Merkle state tree of a previous block of the latest block comprises:

querying the historical account state corresponding to the target account on the historical Merkle state tree of the previous block of the latest block; or querying, in a read-write set corresponding to the previous block of the latest block, the historical account state corresponding to the target account on the historical Merkle state tree of the previous block of the latest block.

3. The computer-implemented method according to claim 2, before the iteratively executing state restoration logic, further comprising:

determining whether a total number of transactions comprised from a genesis block of the blockchain to the target block is greater than a total number of transactions comprised from the target block to the latest block; and in response to determining that the total number of transactions comprised from the genesis block of the blockchain to the target block is greater than the total number of transactions comprised from the target block to the latest block, further iteratively executing the state restoration logic.

4. The computer-implemented method according to claim 1, further comprising:

after a transaction in a block in the blockchain is executed, generating an updated data node corresponding to a current Merkle state tree of the block and a historical data node corresponding to a historical Merkle state tree of the block based on a latest account state of a target account associated with the transaction in the block;

modifying and updating a data node corresponding to the target account on a current Merkle state tree of a previous block of the block based on the updated data node, to obtain the current Merkle state tree of the block; and creating a historical Merkle state tree for the block based on the historical data node and a data node other than a multiplexed data node corresponding to the target account on a historical Merkle state tree of the previous block of the block.

5. The computer-implemented method according to claim 4, wherein the data node on the current Merkle state tree is organized into a balance+ (B+) tree data structure and stored in the database; and the data node on the historical Merkle state tree is organized into a log-structured merge (LSM) tree data structure and stored in the database.

6. The computer-implemented method according to claim 1, wherein:

the database is a key-value database;

a data node on the Merkle state tree is stored in the database in a form of a key-value pair, wherein a key of a data node on the current Merkle state tree comprises a node ID of the data node; and a key of a data node on the historical Merkle state tree comprises a hash value of data content comprised in the data node.

7. The computer-implemented method according to claim 1, wherein the database comprises a LevelDB database, or a database based on a LevelDB architecture.

8. The computer-implemented method according to claim 7, wherein the database comprises a Rocksdb database based on the LevelDB architecture.

9. The computer-implemented method according to claim 1, wherein the Merkle state tree comprises a Merkle state tree variant that integrates a tree structure of a Trie dictionary tree.

10. The computer-implemented method according to claim 9, wherein the Merkle state tree comprises a Merkle Patricia Tree state tree.

11. A computer-implemented apparatus for restoring state data of a blockchain associated with a plurality of blockchain accounts, wherein:

account state data in the blockchain is organized into a Merkle state tree and stored in a database; and the Merkle state tree comprises:

a current Merkle state tree obtained by organizing a latest account state of each blockchain account of the plurality of blockchain accounts, and a historical Merkle state tree obtained by organizing a historical account state of the each blockchain account;

the apparatus comprises:

one or more computers; and one or more computer memory devices interoperably coupled with the one or more computers and having tangible, non-transitory, machine-readable media storing one or more instructions that, when executed by the one or more computers, perform one or more operations comprising:

determining a target block to be restored, wherein the target block is a historical block preceding a latest block of the blockchain; and iteratively executing state restoration logic until a latest account state corresponding to each blockchain account on a current Merkle state tree of the latest block is restored to a historical account state corresponding to each blockchain account on a historical Merkle state tree of the target block, wherein executing the state restoration logic comprises:

determining a target account associated with a transaction in the latest block;

querying a historical account state corresponding to the target account on a historical Merkle state tree of a previous block of the latest block;

modifying a latest account state corresponding to the target account on the current Merkle state tree of the latest block to be the historical account state corresponding to the target account on the historical Merkle state tree of the previous block; and after the modifying, redetermining the previous block as the latest block.

12. The computer-implemented apparatus according to claim 11, wherein:
the determining a target account associated with a transaction in the latest block comprises:
re-executing the transaction in the latest block to determine the target account associated with the transaction in the latest block; or
querying a read-write set corresponding to the latest block to determine the target account associated with the transaction in the latest block; and
the querying a historical account state corresponding to the target account on a historical Merkle state tree of a previous block of the latest block comprises:
querying the historical account state corresponding to the target account on the historical Merkle state tree of the previous block of the latest block; or
querying, in a read-write set corresponding to the previous block of the latest block, the historical account state corresponding to the target account on the historical Merkle state tree of the previous block of the latest block.

13. The computer-implemented apparatus according to claim 12, wherein the operations further comprise, before the iteratively executing state restoration logic:
determining whether a total number of transactions comprised from a genesis block of the blockchain to the target block is greater than a total number of transactions comprised from the target block to the latest block; and
in response to determining that the total number of transactions comprised from the genesis block of the blockchain to the target block is greater than the total number of transactions comprised from the target block to the latest block, further iteratively executing the state restoration logic.

14. The computer-implemented apparatus according to claim 11, wherein the operations further comprise:
after a transaction in a block in the blockchain is executed, generating an updated data node corresponding to a current Merkle state tree of the block and a historical data node corresponding to a historical Merkle state tree of the block based on a latest account state of a target account associated with the transaction in the block;
modifying and updating a data node corresponding to the target account on a current Merkle state tree of a previous block of the block based on the updated data node, to obtain the current Merkle state tree of the block; and
creating a historical Merkle state tree for the block based on the historical data node and a data node other than a multiplexed data node corresponding to the target account on a historical Merkle state tree of the previous block of the block.

15. The computer-implemented apparatus according to claim 14, wherein the data node on the current Merkle state tree is organized into a B+ tree data structure and stored in the database; and the data node on the historical Merkle state tree is organized into an LSM tree data structure and stored in the database.

16. The computer-implemented apparatus according to claim 11, wherein the database comprises a key-value database;
a data node on the Merkle state tree is stored in the database in a form of a key-value pair, wherein a key of a data node on the current Merkle state tree comprises a node ID of the data node; and a key of a data node on the historical Merkle state tree comprises a hash value of data content comprised in the data node.

17. The computer-implemented apparatus according to claim 11, wherein the database comprises a LevelDB database, or a database based on a LevelDB architecture.

18. The computer-implemented apparatus according to claim 17, wherein the database comprises a Rocksdb database based on the LevelDB architecture.

19. The computer-implemented apparatus according to claim 11, wherein the Merkle state tree comprises a Merkle state tree variant that integrates a tree structure of a Trie dictionary tree.

20. The computer-implemented apparatus according to claim 19, wherein the Merkle state tree comprises a Merkle Patricia Tree state tree.

21. A non-transitory, computer-readable medium storing one or more instructions executable by a computer system to perform operations for restoring state data of a blockchain associated with a plurality of blockchain accounts, wherein:
account state data in the blockchain is organized into a Merkle state tree and stored in a database; and
the Merkle state tree comprises:
a current Merkle state tree obtained by organizing a latest account state of each blockchain account of the plurality of blockchain accounts, and
a historical Merkle state tree obtained by organizing a historical account state of the each blockchain account;
the operations comprise:
determining a target block to be restored, wherein the target block is a historical block preceding a latest block of the blockchain; and
iteratively executing state restoration logic until a latest account state corresponding to each blockchain account on a current Merkle state tree of the latest block is restored to a historical account state corresponding to each blockchain account on a historical Merkle state tree of the target block, wherein executing the state restoration logic comprises:
determining a target account associated with a transaction in the latest block;
querying a historical account state corresponding to the target account on a historical Merkle state tree of a previous block of the latest block;
modifying a latest account state corresponding to the target account on the current Merkle state tree of the latest block to be the historical account state corresponding to the target account on the historical Merkle state tree of the previous block; and
after the modifying, redetermining the previous block as the latest block.

22. The non-transitory, computer-readable medium according to claim 21, wherein:
the determining a target account associated with a transaction in the latest block comprises:
re-executing the transaction in the latest block to determine the target account associated with the transaction in the latest block; or
querying a read-write set corresponding to the latest block to determine the target account associated with the transaction in the latest block; and
the querying a historical account state corresponding to the target account on a historical Merkle state tree of a previous block of the latest block comprises:

querying the historical account state corresponding to the target account on the historical Merkle state tree of the previous block of the latest block; or querying, in a read-write set corresponding to the previous block of the latest block, the historical account state corresponding to the target account on the historical Merkle state tree of the previous block of the latest block.

23. The non-transitory, computer-readable medium according to claim 22, wherein the operations further comprise, before the iteratively executing state restoration logic:

determining whether a total number of transactions comprised from a genesis block of the blockchain to the target block is greater than a total number of transactions comprised from the target block to the latest block; and in response to determining that the total number of transactions comprised from the genesis block of the blockchain to the target block is greater than the total number of transactions comprised from the target block to the latest block, further iteratively executing the state restoration logic.

24. The non-transitory, computer-readable medium according to claim 21, wherein the operations further comprise:

after a transaction in a block in the blockchain is executed, generating an updated data node corresponding to a current Merkle state tree of the block and a historical data node corresponding to a historical Merkle state tree of the block based on a latest account state of a target account associated with the transaction in the block;

modifying and updating a data node corresponding to the target account on a current Merkle state tree of a previous block of the block based on the updated data node, to obtain the current Merkle state tree of the block; and creating a historical Merkle state tree for the block based on the historical data node and a data node other than a multiplexed data node corresponding to the target account on a historical Merkle state tree of the previous block of the block.

25. The non-transitory, computer-readable medium according to claim 24, wherein the data node on the current Merkle state tree is organized into a B+ tree data structure and stored in the database; and the data node on the historical Merkle state tree is organized into an LSM tree data structure and stored in the database.

26. The non-transitory, computer-readable medium according to claim 21, wherein the database comprises a key-value database;

a data node on the Merkle state tree is stored in the database in a form of a key-value pair, wherein a key of a data node on the current Merkle state tree comprises a node ID of the data node; and a key of a data node on the historical Merkle state tree comprises a hash value of data content comprised in the data node.

27. The non-transitory, computer-readable medium according to claim 21, wherein the database comprises a LevelDB database, or a database based on a LevelDB architecture.

28. The non-transitory, computer-readable medium according to claim 27, wherein the database comprises a Rocksdb database based on the LevelDB architecture.

29. The non-transitory, computer-readable medium according to claim 21, wherein the Merkle state tree comprises a Merkle state tree variant that integrates a tree structure of a Trie dictionary tree.

30. The non-transitory, computer-readable medium according to claim 29, wherein the Merkle state tree comprises a Merkle Patricia Tree state tree.

* * * * *

UNITED STATES PATENT AND TRADEMARK OFFICE
CERTIFICATE OF CORRECTION

PATENT NO. : 10,761,948 B1  
APPLICATION NO. : 16/776301  
DATED : September 1, 2020  
INVENTOR(S) : Haizhen Zhuo, Benquan Yu and Zhonghao Lu Page 1 of 1

It is certified that error appears in the above-identified patent and that said Letters Patent is hereby corrected as shown below:

On the Title Page

Under Foreign Application Priority Data
Column 1, Line 1, delete "Jul. 13, 2019" and insert -- Jul. 31, 2019 --, therefor.

Signed and Sealed this
Tenth Day of November, 2020

Andrei Iancu
*Director of the United States Patent and Trademark Office*